United States Patent
Tamaki et al.

(10) Patent No.: US 6,905,635 B2
(45) Date of Patent: Jun. 14, 2005

(54) GALLIUM NITRIDE PHOSPHOR, ITS METHOD OF MANUFACTURE, AND A DISPLAY DEVICE USING THE PHOSPHOR

(75) Inventors: Hiroto Tamaki, Anan (JP); Masatoshi Kameshima, Anan (JP); Yoshitaka Sato, Mobara (JP)

(73) Assignees: Nichia Corporation, Tokushima (JP); Futaba Corporation, Chiba (JP)

( * ) Notice: Subject to any disclaimer, the term of this patent is extended or adjusted under 35 U.S.C. 154(b) by 3 days.

(21) Appl. No.: 10/407,197

(22) Filed: Apr. 7, 2003

(65) Prior Publication Data

US 2003/0190806 A1 Oct. 9, 2003

(30) Foreign Application Priority Data

Apr. 9, 2002 (JP) ........................................ 2002-107076

(51) Int. Cl.$^7$ .............................................. C09K 11/00
(52) U.S. Cl. ............................... 252/301.4 R; 313/503; 117/952
(58) Field of Search .................. 252/301.4 R; 313/503; 117/952

(56) References Cited

U.S. PATENT DOCUMENTS

| | | | | |
|---|---|---|---|---|
| 5,926,726 A | * | 7/1999 | Bour et al. | .................. 438/507 |
| 6,017,807 A | * | 1/2000 | Furukawa et al. | ........... 438/502 |
| 6,337,035 B1 | * | 1/2002 | Itoh et al. | ............. 252/301.4 R |
| 2002/0157596 A1 | * | 10/2002 | Stockman et al. | ............. 117/2 |

* cited by examiner

Primary Examiner—C. Melissa Koslow
(74) Attorney, Agent, or Firm—Wenderoth, Lind & Ponack, L.L.P.

(57) ABSTRACT

This invention presents a gallium nitride phosphor with superior light emitting characteristics, its method of manufacture, and a display device which uses the phosphor. By heat treatment or microwave irradiation of gallium nitride phosphor powder in an ambient containing essentially no $H_2$ or $H_2O$, a phosphor is produced wherein the amount of $H_2$ and $H_2O$ gas evolved when heated in a vacuum is less than or equal to 0.2 cm$^3$/g of phosphor and 2.0 cm$^3$/g of phosphor respectively.

10 Claims, 3 Drawing Sheets

(a)

(b)

GALLIUM NITRIDE PHOSPHOR, ITS METHOD OF MANUFACTURE, AND A DISPLAY DEVICE USING THE PHOSPHOR

This application is based on application Ser. No. 107076 filed in Japan on Apr. 9, 2002, the content of which is incorporated hereunto by reference.

BACKGROUND OF THE INVENTION

The present invention relates to a phosphor used in a fluorescent display tube, field emission display (FED), or projection tube, and In particular to a gallium nitride phosphor with superior light emitting characteristics, its method of manufacture, and a display device using the phosphor.

Gallium nitride phosphor (GaN phosphor) is a IIIb-Vb compound formed from a group IIIb elements (B, Al, Ga, In) and a group Vb elements (N, P, As, Sb). As a compound semiconductor, gallium nitride is used in single crystal thin film form for opto-electronic devices such as light emitting diodes, laser diodes, and photo-diodes, and as a high speed device material for devices such as field effect transistors. However, gallium nitride has not yet found practical application as a phosphor.

In general GaN phosphor is synthesized by firing a raw material mixture in an ambient including $NH_3$ gas. The raw material is a mixture of Ga metal or compounds including the element Ga such as $Ga_2S_3$ and $Ga_2O_3$, with metals or compounds Including activating elements such as Zn and Mg and co-activating elements such as Si, Ge, S, and O. During firing, $NH_3$ dissociates generating active nitrogen causing nitriding reactions to proceed, but simultaneous generation of active hydrogen causes hydrogenation of activating additives such as Zn and Mg making them Inactive. For this reason, degradation of phosphor characteristics has been a problem. In addition, moisture is produced during firing of the raw material mixture, and moisture absorbed by the phosphor during treatment remains with the phosphor. When the phosphor is used in a device, residual moisture is scattered internally and contaminates electrodes causing device performance degradation. As a result of these problems, prior art GaN system phosphors, which include large amounts of $H_2$ and $H_2O$, have poor luminescence characteristics, and their practical application in display devices such as fluorescent display tubes has been difficult.

Consequently, the object of the present invention is to solve the problems described above. Specifically, it is the object of the present invention to provide a gallium nitride phosphor with superior luminescence characteristics, a method of manufacture of the phosphor, and a display device using the phosphor.

The above and further objects and features of the invention will more fully be apparent from the following detailed description with accompanying drawings.

SUMMARY OF THE INVENTION

The inventors performed an in-depth study of gallium nitride phosphors such as GaN and (Ga, In)N to solve the problems described above. As a result, they succeeded in producing a gallium nitride phosphor with superior luminescence characteristics by limiting the amount of $H_2$ included in the phosphor below a prescribed level. Further, it is preferable to limit the amounts of both $H_2$ and $H_2O$ below the prescribed levels to improve luminescence characteristics of the gallium nitride phosphor of the present invention.

$H_2$ and $H_2O$ included in a gallium nitride phosphor can be held at or below prescribed levels by heat treatment or microwave irradiation of the phosphor. In the method of manufacture of the gallium nitride phosphor of the present invention, the phosphor is heat treated at 500° C. to 1100° C. for 10 minutes or more in an ambient including essentially no $H_2$ or $H_2O$ gas. More preferably, heat treatment temperature is greater than or equal to 600° C. Further, an ambient including an inert gas such as nitrogen or argon gas, a low pressure ambient, or an atmospheric ambient are preferable. In the method of manufacture of the gallium nitride phosphor of the present invention, the phosphor powder is irradiated by microwave in an ambient including essentially no $H_2$ or $H_2O$ gas. Heat treated or microwave irradiated gallium nitride phosphor has its $H_2$ and $H_2O$ removed by heat or microwave and achieve superior luminescence characteristics.

By heat treatment or microwave irradiation of gallium nitride phosphor powder in an ambient including essentially no $H_2$ or $H_2O$ gas, a gallium nitride phosphor can be obtained which evolves less than or equal to 0.2 $cm^3/g$ and 2.0 $cm^3/g$ of $H_2$ and $H_2O$ gas respectively per weight of phosphor when heated in a vacuum. Thus, phosphor luminescence characteristics can be vastly improved.

As described above, gallium nitride phosphor is synthesized by firing a raw material mixture in an $NH_3$ gas ambient, but hydrogenation of activating additives such as Zn and Mg by active hydrogen produced by $NH_3$ dissociation makes the additives inactive and results in degradation of phosphor luminescence characteristic. In addition, when the phosphor is used in a device, moisture included in the phosphor is scattered internally and contaminates electrodes causing degradation of device performance. In contrast to prior art gallium nitride phosphors which contain large amounts of $H_2$ or $H_2O$ and have poor luminescence characteristics, the gallium nitride phosphor of the present invention holds $H_2$ and $H_2O$ included in the phosphor at or below prescribed levels by heat treatment or microwave irradiation of the phosphor in an ambient including essentially no H2 or $H_2O$. This reactivates activating additives such as Zn and Mg, improves phosphor luminescence characteristics, and improves performance of display devices using the phosphor such as fluorescent display tubes, FEDs, and projection tubes.

DETAILED DESCRIPTION OF THE INVENTION

Figure 1:
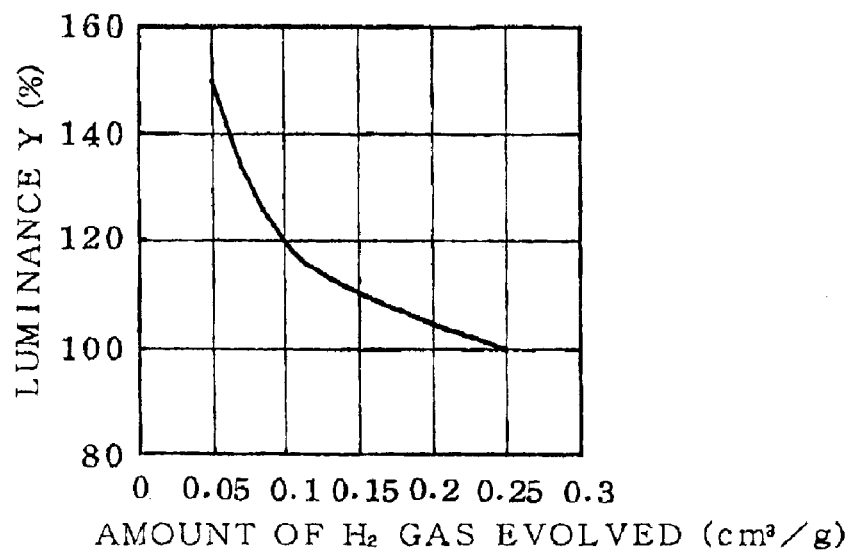
FIG. 1 is a graph showing the relation between fluorescent display tube luminance and the quantity of evolved $H_2$ gas for a phosphor which was heat treated in a nitrogen gas ambient.

A gallium nitride phosphor of the present invention is produced in the following manner. The chemical composition formula below describes the phosphor.

(Ga, X) N: Y, Z

Here, X is at least one of the elements in, B, and Al; Y is at least one of the elements selected from the group Be, Zn, Mg, Ca, Sr, Ba, Cd, and Hg; and Z is at least one of the elements selected from the group O, S, Se, Te, Pb, C, Si, Ge, and Sn.

A raw material mixture of gallium compounds, compounds including above elements X, compounds including above elements Y, and compounds including above elements Z; or a co-precipitate of gallium, above elements X, above elements Y, and above elements Z, are used as raw materials for a gallium nitride phosphor with the chemical composition formula above. The phosphor is produced by firing the raw materials at 500° C. to 1200° C. while flowing a gas including $NH_3$ gas.

Compounds such as oxides and sulfides are preferable as the gallium compounds, compounds including above elements X, and compounds including above elements Y. This introduces elements such as O and S into the gallium nitride phosphor without separately mixing in compounds including above elements Z.

As a co-precipitate including gallium, above elements X, above elements Y, and above elements Z, the precipitate is preferably produced by adding liquid ammonia or oxalic acid, etc. to an aqueous solution including the named elements. Pyrolysis can be performed and the precipitate can be used.

Gallium nitride phosphor obtained in this manner is heat treated or microwave irradiated in a gas ambient including essentially no $H_2$ or $H_2O$. Heat treatment is at a temperature of 500° C. to 1100° C. for 10 minutes or more. An ambient with essentially no $H_2$ or $H_2O$ is suitable for heat treatment or microwave irradiation, and heat treatment can be performed in an ambient including inert gases such as $N_2$, He, Ne, and Ar, a low pressure ambient, an atmospheric ambient, or an oxygen ambient. Optimal heat treatment conditions are different depending on the gas ambient. In general, the effect of heat treatment depends on temperature. De-gassing effects are minimal at temperatures below 500° C., and dissociation of the primary gallium nitride compound proceeds markedly and becomes difficult to control above 1100° C. There is an effect with 10 minutes or more of heat treatment, and a time greater than or equal to 60 minutes is preferable.

The effect of microwave irradiation depends on microwave power, phosphor weight, and irradiation time. Microwave power with respect to weight of irradiated of gallium nitride phosphor is set from 1 W/g to 100 W/g, and irradiation time is made greater than or equal to 30 minutes.

Similar effects can also be obtained by heat treatment or microwave irradiation of gallium nitride phosphor which has had prior surface treatment such as with an acid or base. For example, post-fired gallium nitride phosphor is stirred in a 0.1 mole/l aqueous nitric acid solution at 50° C. for 1 hour, rinsed, dried, and dehydrated. Although the moisture quantity which can be removed from the gallium nitride phosphor increases due to acid treatment, the quantity of both hydrogen and moisture which can evolve decreases after subsequent heat treatment or microwave irradiation, and luminance is improved.

The quantity of $H_2$ and $H_2O$ gas evolved from the phosphor of the present invention when heated in a vacuum can be measured using thermal desorption spectroscopy (TDS). First, approximately 10 mg of phosphor powder is accurately weighed, then loaded on the sample stage of an ESCO Ltd. EMD-WA1000S thermal desorption spectroscopy apparatus. Next, after decompress to a pressure in the range of $10^{-7}$ Pa to $10^{-8}$ Pa, temperature is raised to 1000° C. at a rate of 60° C./min. After the temperature has been raised to 1000° C., it is held at that temperature for approximately 20 min. to completely evolve sample gases. From the beginning of temperature rise, $H_2$ and $H_2O$ evolved from the gallium nitride phosphor register signal counts on a quadrapole mass spectrometer installed above the sample holder. The counts are integrated and from these data thermal desorption spectra integrated areas are obtained for each gas. For quantitative analysis, a Si substrate previously ion implanted with a known quantity of hydrogen is used as a standard, and the measured hydrogen thermal desorption spectrum for the standard is used as a calibration curve. Considering ion fragmentation factors and ionization coefficients of other elements, the hydrogen baseline is a standard for quantifying other species such as $H_2O$.

Next, fluorescent display tubes were made using the phosphor of the present invention, and the relation between display tube luminance when excited with 50 Vdc and evolved $H_2$ and $H_2O$ gas as measured above is shown in FIGS. 1 through 4. Here, luminance (Y) is the relative value (relative luminance) with reference (Y=100%) to a phosphor with no heat treatments or microwave irradiation. Characteristics of the gallium nitride phosphor of the present invention are described in detail with reference to these graphs.

Figure 2:
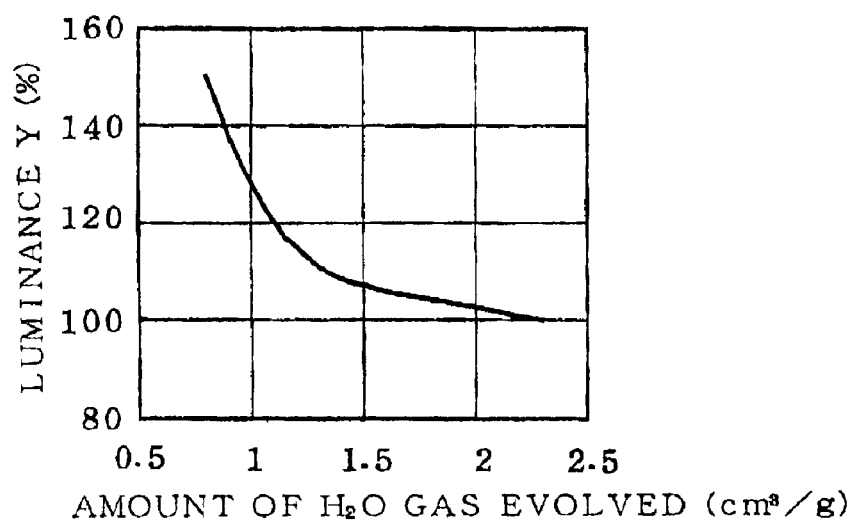
FIG. 2 is a graph showing the relation between fluorescent display tube luminance and the quantity of evolved $H_2O$ gas for a phosphor which was heat treated in a nitrogen gas ambient.

FIG. 1 shows the relation between fluorescent display tube luminance and the amount of $H_2$ gas evolved from gallium nitride phosphor powders which were heat treated in nitrogen gas ambient at 500° C. to 900° C. From this figure it is clear that luminance is high when the amount of $H_2$ gas evolved is at or below 0.2 $cm^3/g$, and luminance is particularly high at or below 0.1 $cm^3/g$. FIG. 2 shows the relation between phosphor display tube luminance and the amount of $H_2O$ gas evolved from gallium nitride phosphors which were heat treated in analogous fashion. From this figure it is clear that luminance is high when the amount of $H_2O$ gas evolved is at or below 2.0 $cm^3/g$, and luminance is particularly high at or below 1.5 $cm^3/g$. Similar results were obtained with ambient including gases other than $N_2$ such as inert gases He, Ar, Ne, and $CO_2$, as well as for low pressure ambient conditions.

Figure 3:
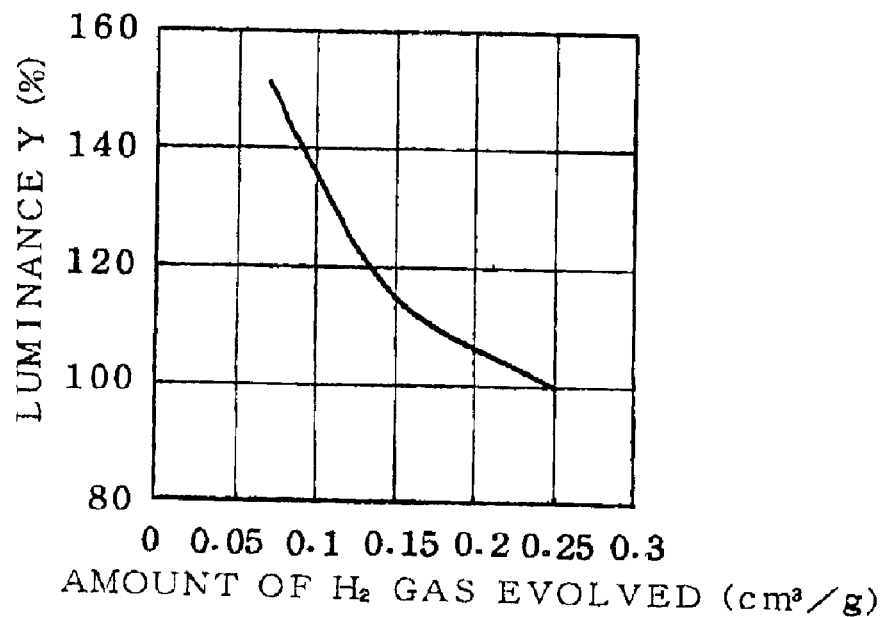
FIG. 3 is a graph showing the relation between fluorescent display tube luminance and the quantity of evolved $H_2$ gas for a phosphor which was heat treated in an atmospheric ambient.
Figure 4:
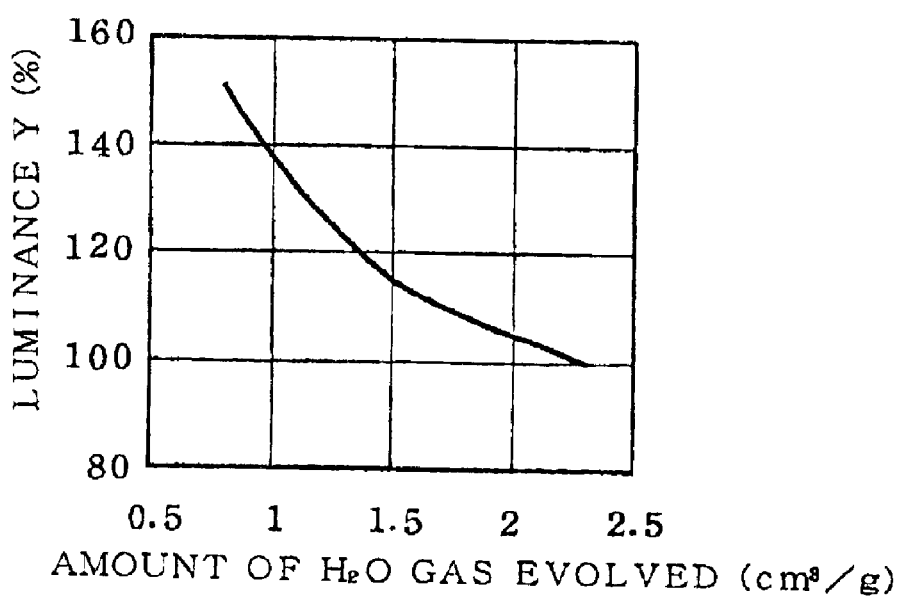
FIG. 4 is a graph showing the relation between fluorescent display tube luminance and the quantity of evolved $H_2O$ gas for a phosphor which was heat treated in an atmospheric ambient.

FIG. 3 shows the relation between fluorescent display tube luminance and the amount of $H_2$ gas evolved from gallium nitride phosphor powders which were heat treated in atmospheric ambient at 500° C. to 700° C. From this figure it is clear that luminance is high when the amount of $H_2$ gas evolved is at or below 0.2 $cm^3/g$, and luminance is particularly high at or below 0.15 $cm^3/g$. FIG. 4 shows the relation between fluorescent display tube luminance and the amount of $H_2O$ gas evolved from gallium nitride phosphors which were heat treated in analogous fashion. From this figure it is clear that luminance is high when the amount of $H_2O$ gas evolved is at or below 2.0 $cm^3/g$, and luminance is particularly high at or below 1.5 $cm^3/g$. However, in the case of atmospheric ambient and heat treatment temperatures above 800° C., phosphor surface oxidation takes place, excessive gallium nitride phosphor decomposition proceeds, and fluorescent display tube luminance drops regardless of reduction in evolved $H_2$ and $H_2O$ gas. Oxygen ambient results were similar to atmospheric ambient results.

[Embodiments]

COMPARISON EXAMPLE 1

The following raw materials are weighed out.

| | |
|---|---|
| $Ga_2S_3$ | 30 g |
| $In_2S_3$ | 0.5 g |
| ZnS | 6 g |

The raw materials above are thoroughly mixed together, and the raw material mixture is loaded in an alumina boat and inserted into a furnace. The mixture is fired at 1100° C. for 3 hours while supplying $NH_3$ gas at a flow rate of 1.5 liters/min., and subsequently cooled. The alumina boat is removed and (Ga, In) N: Zn, S phosphor is obtained.

[Embodiment 1]

The gallium nitride phosphor powder obtained in comparison example 1 is loaded in an alumina boat and inserted into a furnace. The mixture is heat treated at 800° C. for 1 hour while supplying $N_2$ gas at a flow rate of 1.0 liter/min., and subsequently cooled. The alumina boat is removed and a phosphor of the present invention is obtained. When desorbed gases from the phosphor are measured by the TDS method previously described, the amount of $H_2$ gas evolved by heating in a vacuum is 0.07 $cm^3/g$, and the amount of $H_2O$ gas evolved is 0.9 $cm^3/g$.

Figure 5:
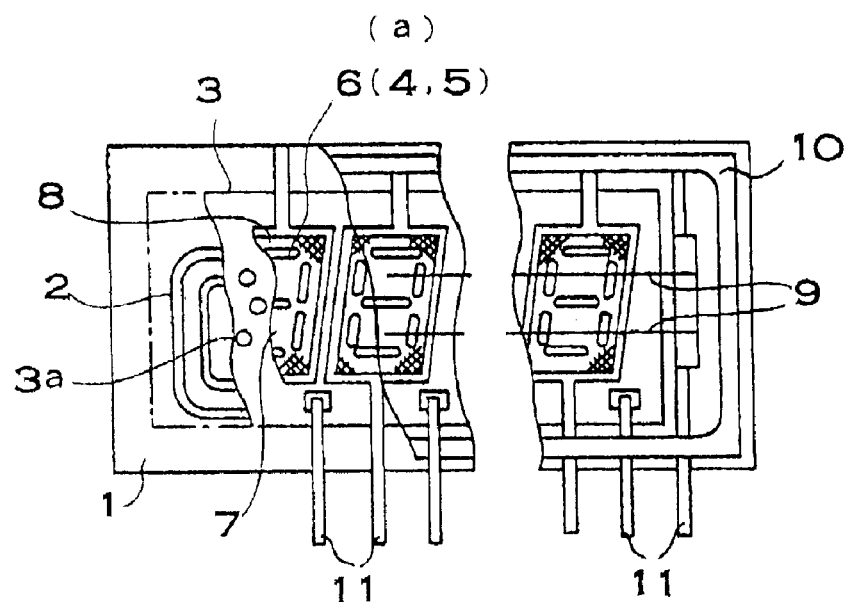
FIG. 5 is a plan view partially cutaway (a) and an enlarged cross-section view (b) showing important elements of a fluorescent display tube of the present invention.
Figure 5:
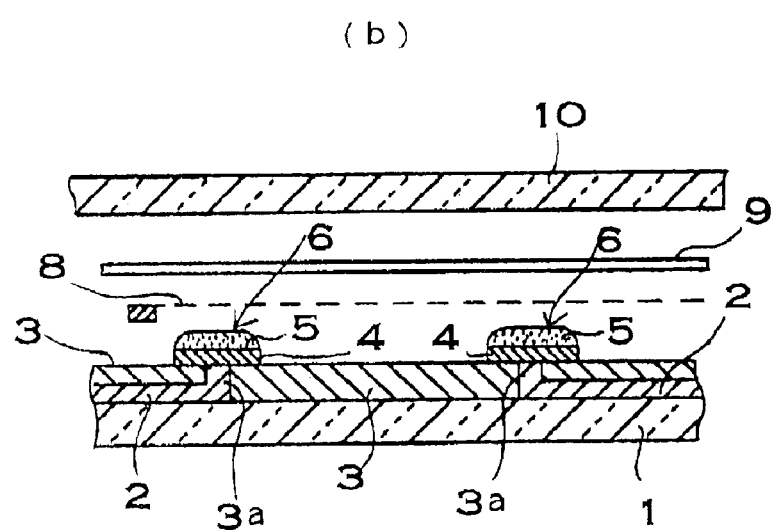

A fluorescent display tube as shown in FIGS. 5(a) and (b) is made using a phosphor of the present invention produced by heat treatment in nitrogen gas ambient as described above. FIG. 5(a) is a plan view partially cutaway showing important elements of a phosphor display tube of the present invention and FIG. 5(b) is an enlarged cross-section view of the same important elements. Here, 1 is a substrate of insulating material such as glass or ceramic with conductive interconnect material 2 deposited on the substrate 1, and covered by an insulating layer 3 with through-holes 3a formed at specified conductive interconnect 2 locations. This insulating layer 3 is a mixture of low melting point frit-glass, which is the primary component, binder, and black pigment. It is prepared in paste form, printed, and fired. 4 is conducting anode material formed on top of the insulating layer 3 in seven-segment display configuration. Phosphor of the present invention is deposited on the conducting anode material 4 to form phosphor layer 5 and anodes 6 by well known methods such as screen printing, electro-deposition, or precipitation. Further, anodes 6 are formed in an array of single-digit seven-segment displays 7. 8 are mesh control electrodes disposed above the surfaces of the seven segment displays 7. 9 are cathode filaments which emit electrons when heated. 10 is a box-shaped front panel enclosure which is attached to the substrate 1 at its periphery, together with the substrate 1 forms the outer walls of a vacuum vessel to maintain high vacuum at each electrode, and has transparent regions at least at display windows. 11 are terminal leads which pass through the region of attachment between the front panel enclosure and the substrate in an airtight fashion, and input activating signals to each of the electrodes. When this fluorescent display tube is driven with 50 Vdcx7 mA/$cm^2$, chromaticity (x, y) and luminance (Y) are x=0.161, y=0.138, and Y=134%.

[Embodiments 2 through 6]

Gallium nitride phosphors of embodiments 2 through 6 are produced from the gallium nitride phosphor powder in comparison example 1 in the same manner as embodiment 1 except that heat treatment temperatures are 500° C., 600° C., 700° C., 900° C., and 1000° C. respectively.

[Embodiments 7 through 10]

Gallium nitride phosphors of embodiments 7 through 10 are produced from the gallium nitride phosphor powder in comparison example 1 in the same manner as embodiment 1 except that heat treatment is in an atmospheric ambient and temperatures are 500° C., 600° C., 700° C., and 800° C. respectively.

[Embodiments 11 through 13]

Gallium nitride phosphors of embodiments 11 through 13 are produced from the gallium nitride phosphor powder in comparison example 1 in the same manner as embodiment 1 except that heat treatment is in an argon ambient and temperatures are 500° C., 700° C., and 900° C. respectively.

[Embodiments 14 through 17]

Gallium nitride phosphors of embodiments 14 through 17 are produced from the gallium nitride phosphor powder in comparison example 1 in the same manner as embodiment 1 except that heat treatment is in a low pressure (vacuum) ambient and temperatures are 500° C., 700° C., 900° C., and 1100° C. respectively.

COMPARISON EXAMPLE 2

The gallium nitride phosphor of comparison example 2 is produced from the gallium nitride phosphor powder in comparison example 1 in the same manner as embodiment 1 except that heat treatment is in an ammonia ambient and the temperature is 800° C.

COMPARISON EXAMPLES 3 THROUGH 7

Acid treated gallium nitride phosphors of comparison examples 3 through 7 are produced by stirring the gallium nitride phosphor powder in comparison example 1 in each 0.1 mole/l aqueous solutions of hydrochloric acid, nitric acid, sulfuric acid, phosphoric acid, and acetic acid respectively at 50° C. for 1 hour, then rinsing, drying, and dehydrating the resulting phosphors.

[Embodiments 18 through 22]

Gallium nitride phosphors of embodiments 18 through 22 are produced from the gallium nitride phosphor powders for comparison examples 3 through 7 by heat treating in the same manner as embodiment 1

[Embodiment 23]

The gallium nitride phosphor of embodiment 23 is produced by loading 100 g of the gallium nitride phosphor powder in comparison example 1 in an alumina boat, inserting the boat in a microwave heating apparatus connected to a microwave generating device, and irradiating the phosphor in a nitrogen ambient with 28 GHz microwave radiation at a power output of 900 W for 1 hour.

[Embodiment 24]

The microwave irradiated phosphor of embodiment 24 is produced from the gallium nitride phosphor powder in comparison example 1 in the same manner as embodiment 23 except that microwave irradiation is in an atmospheric ambient for 30 min.

[Embodiment 25]

The microwave irradiated phosphor of embodiment 25 is produced from the gallium nitride phosphor powder in comparison example 1 in the same manner as embodiment 23 except that microwave irradiation is in an argon ambient.

[Embodiment 26]

The microwave irradiated phosphor of embodiment 26 is produced from the gallium nitride phosphor powder in comparison example 1 in the same manner as embodiment 23 except that microwave irradiation is in a low pressure (vacuum) ambient.

The amounts of $H_2$ and $H_2O$ gas evolved from the gallium nitride phosphors obtained in embodiments 1 through 26 and comparison examples 1 through 7 were measured by TDS as described previously. Further, phosphor display tubes were made in the same manner as in embodiment 1 using these gallium nitride phosphors, Table 1 shows chromaticity (x, y) and luminance (Y) for the phosphor display tubes driven with 50 Vdc×7 mA/cm².

TABLE 1

| | Amount of gas evolved (cm³/g) | | Fluorescent display tube | | |
|---|---|---|---|---|---|
| | $H_2$ | $H_2O$ | x | y | Luminance Y (%) |
| Comparison 1 | 0.25 | 2.3 | 0.163 | 0.142 | 100 |
| embodiment 1 | 0.07 | 0.9 | 0.161 | 0.138 | 134 |
| embodiment 2 | 0.17 | 1.4 | 0.161 | 0.140 | 108 |
| embodiment 3 | 0.12 | 1.2 | 0.162 | 0.140 | 115 |
| embodiment 4 | 0.10 | 1.1 | 0.163 | 0.142 | 120 |
| embodiment 5 | 0.05 | 0.8 | 0.160 | 0.138 | 150 |
| embodiment 6 | 0.04 | 0.7 | 0.160 | 0.136 | 131 |
| embodiment 7 | 0.15 | 1.5 | 0.163 | 0.140 | 115 |
| embodiment 8 | 0.09 | 1.0 | 0.162 | 0.139 | 141 |
| embodiment 9 | 0.07 | 0.8 | 0.163 | 0.138 | 151 |
| embodiment 10 | 0.07 | 0.8 | 0.162 | 0.139 | 102 |
| embodiment 11 | 0.15 | 0.2 | 0.162 | 0.142 | 109 |
| embodiment 12 | 0.08 | 0.8 | 0.162 | 0.142 | 115 |
| embodiment 13 | 0.05 | 0.9 | 0.161 | 0.139 | 155 |
| embodIment 14 | 0.12 | 0.9 | 0.162 | 0.141 | 120 |
| embodiment 15 | 0.07 | 0.7 | 0.162 | 0.140 | 130 |
| embodiment 16 | 0.05 | 0.9 | 0.161 | 0.136 | 141 |
| embodiment 17 | 0.04 | 0.9 | 0.162 | 0.140 | 150 |
| comparison 2 | 0.26 | 1.1 | 0.163 | 0.141 | 90 |
| comparison 3 | 0.23 | 2.8 | 0.162 | 0.140 | 85 |
| comparison 4 | 0.18 | 2.5 | 0.162 | 0.140 | 94 |
| comparison 5 | 0.21 | 2.6 | 0.162 | 0.141 | 75 |
| comparison 6 | 0.19 | 2.9 | 0.163 | 0.141 | 106 |
| comparison 7 | 0.22 | 2.5 | 0.163 | 0.143 | 93 |
| embodiment 18 | 0.08 | 1.3 | 0.160 | 0.138 | 115 |
| embodiment 19 | 0.05 | 0.7 | 0.162 | 0.138 | 143 |
| embodiment 20 | 0.08 | 0.9 | 0.163 | 0.142 | 115 |
| embodiment 21 | 0.06 | 0.7 | 0.161 | 0.138 | 137 |
| embodiment 22 | 0.09 | 1.2 | 0.163 | 0.142 | 125 |
| embodiment 23 | 0.07 | 0.9 | 0.161 | 0.138 | 145 |
| embodiment 24 | 0.08 | 1.0 | 0.163 | 0.139 | 140 |
| embodIment 25 | 0.08 | 1.0 | 0.161 | 0.139 | 138 |
| embodIment 26 | 0.06 | 0.8 | 0.161 | 0.138 | 145 |

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A gallium nitride phosphor of the formula (Ga, In) N:ZnS wherein the amount of $H_2$ gas evolved when heated in a vacuum is less than or equal to 0.2 cm³/g of phosphor and the amount of $H_2O$ gas evolved when heated in a vacuum is less than or equal to 2.0 cm³/g of phosphor.

2. A gallium nitride phosphor as recited in claim 1 wherein the amount of $H_2O$ gas evolved when heated in a vacuum is less than or equal to 1.5 cm³/g of phosphor.

3. A method of manufacture of gallium nitride phosphor which comprises heat treating gallium nitride phosphor powder in an ambient containing essentially no $H_2$ or $H_2O$ at a temperature of 500° C. to 1100° C. for a period greater than or equal to 10 min., wherein the amount of $H_2$ gas evolved when the phosphor is heated in a vacuum is less than or equal to 0.2 cm³/g of phosphor, and wherein the ambient for heat treatment of the gallium nitride phosphor powder contains argon gas.

4. A method of manufacture of gallium nitride phosphor which comprises heat treating gallium nitride phosphor powder in an ambient containing essentially no $H_2$ or $H_2O$ at a temperature of 500° C. to 1100° C. for a period greater than or equal to 10 min., wherein the amount of $H_2$ gas evolved when the phosphor is heated in a vacuum is less than or equal to 0.2 cm³/g of phosphor, and wherein the ambient for heat treatment of the gallium nitride phosphor powder is a low pressure ambient.

5. A method of manufacture of gallium nitride phosphor which comprises heat treating gallium nitride phosphor powder in an ambient containing essentially no $H_2$ or $H_2O$ at a temperature of 500° C. to 1100° C. for a period greater than or equal to 10 min., wherein the amount of H, gas evolved when the phosphor is heated in a vacuum is less than or equal to 0.2 cm³/g of phosphor, and wherein acid treated gallium nitride phosphor powder is heat treated.

6. A method of manufacture of gallium nitride phosphor wherein gallium nitride phosphor powder is irradiated with microwaves in an ambient containing essentially no $H_2$ or $H_2O$, and the amount of $H_2$ gas evolved when the phosphor is heated in a vacuum is less than or equal to 0.2 cm³/g of phosphor.

7. A method of manufacture of gallium nitride phosphor as recited in claim 6 wherein acid treated gallium nitride phosphor powder is irradiated with microwaves.

8. A method of manufacture of gallium nitride phosphor as recited in claim 6 wherein the amount of $H_2O$ gas evolved when heated in a vacuum is less than or equal to 2.0 cm³/g of phosphor.

9. A method of manufacture of gallium nitride phosphor as recited in claim 6 wherein the phosphor has the following formula

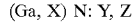

(Ga, X) N: Y, Z where X is at least one of the elements In, B, and Al; Y is at least one of the elements selected from the group Be, Zn, Mg, Ca, Sr, Ba, Cd, and Hg; and Z is at least one of the elements selected from the group O, S, Se, Te, Pb, C, Si, Ge, and Sn.

10. A display device which comprises the gallium nitride phosphor as recited in claim 1.

* * * * *